(12) United States Patent
Ferret

(10) Patent No.: US 6,430,553 B1
(45) Date of Patent: Aug. 6, 2002

(54) METHOD AND APPARATUS FOR PARSING DATA

(75) Inventor: Bernard A. Ferret, Fairfax, VA (US)

(73) Assignee: Exactone.com, Inc., Herndon, VA (US)

( * ) Notice: Subject to any disclaimer, the term of this patent is extended or adjusted under 35 U.S.C. 154(b) by 0 days.

(21) Appl. No.: 09/532,938

(22) Filed: Mar. 22, 2000

(51) Int. Cl.[7] .............................................. G06F 17/30
(52) U.S. Cl. .............................................................. 707/3
(58) Field of Search ................................................ 707/3

(56) References Cited

U.S. PATENT DOCUMENTS

| | | | |
|---|---|---|---|
| 5,664,173 | A | 9/1997 | Fast |
| 5,678,039 | A | 10/1997 | Hinks et al. |
| 5,857,184 | A | 1/1999 | Lynch |
| 5,893,091 | A | 4/1999 | Hunt et al. |
| 5,966,126 | A | 10/1999 | Szabo |
| 6,003,024 | A | 12/1999 | Bair et al. |
| 6,029,175 | A * | 2/2000 | Chow et al. ................... 707/10 |
| 6,038,561 | A * | 3/2000 | Snyder et al. ................. 707/10 |
| 6,044,403 | A * | 3/2000 | Gerszberg et al. ........... 709/217 |
| 6,076,088 | A * | 6/2000 | Paik et al. ....................... 707/5 |
| 6,134,548 | A * | 10/2000 | Gottsman et al. ............. 705/26 |
| 6,195,651 | B1 * | 2/2001 | Handel et al. .................. 707/2 |
| 6,249,252 | B1 * | 6/2001 | Dupray .................... 342/357.01 |
| 6,317,718 | B1 * | 11/2001 | Fano .............................. 705/1 |
| 6,351,467 | B1 * | 2/2002 | Dillion ....................... 370/432 |
| 6,356,905 | B1 * | 3/2002 | Gershman et al. ............. 705/26 |
| 6,359,976 | B1 * | 3/2002 | Kalyanpur et al. ......... 379/111 |
| 6,377,939 | B1 * | 4/2002 | Young ........................... 705/34 |

* cited by examiner

*Primary Examiner*—Wayne Amsbury
(74) *Attorney, Agent, or Firm*—Holland & Knight LLP

(57) ABSTRACT

A computer implemented method and a computer program product that is stored on computer readable media provides a parsing engine which will apply meta-language instructions to parse items discovered in a computer-based search with particular application to web sites accessible using the internet.

26 Claims, 10 Drawing Sheets

General algorithm of the parsing engine.

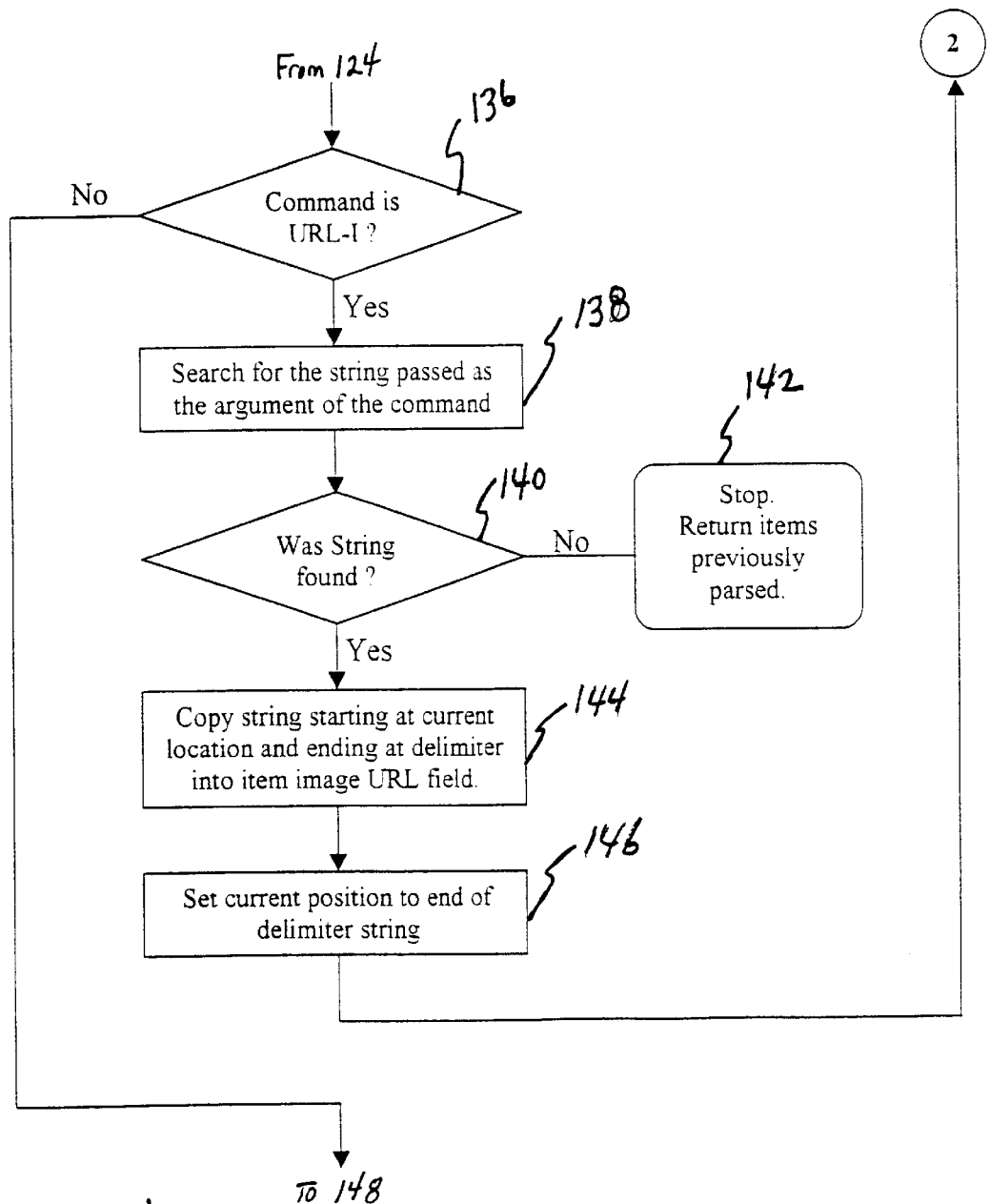

METHOD AND APPARATUS FOR PARSING DATA

BACKGROUND OF THE INVENTION

The present invention relates broadly to computer implemented methods and software products that analyze, sort and retrieve data, and, more specifically, to a computer implemented method and software product for parsing data resulting from an internet based search query.

The internet, or world-wide web, has provided the ability to communicate between computers throughout the world and has placed a multitude of remote computers at the disposal of any given computer user. These remote computers may be computers which contain data that has been classified, arranged and otherwise stored and sorted in accordance with predetermined criteria with the data being located in specific fields. Such databases have many uses, both commercial and non-commercial. Such non-commercial uses can include scientific study and research, and such commercial uses can include what has become known as e-commerce, providing the ability for consumers to shop for specific items from web sites using the internet.

In order to find the correct information, programs known as search engines have developed which prompt the user to enter a search term or terms and the search engine will cause the computer to search at least a portion of the internet to find an answer to the search query.

In a commercial arena, for example, consumer shopping, the ability to easily locate products for purchase is somewhat limited by the necessity of the consumer to choose an applicable web site for a particular product. Other search engines have been developed, known as "shopping bots", that will search the internet for specific products at a variety of locations. The current search engines are sometimes slow and inaccurate.

SUMMARY OF THE INVENTION

It is accordingly an object of the present invention to provide a computer implemented method and a computer software product which will more efficiently query remote computers and, more particularly, internet web sites for specific items of information.

It is another object of the present invention to provide such a computer implemented method and computer program product that will use meta-language to parse data received from specific web sites in order to provide a more accurate and rapid internet search.

To those ends, a computer implemented method for retrieving by a control computer select information from one or more remote computers includes the steps of a) receiving by the control computer information regarding a search query from a requesting computer; b) analyzing, using the control computer, the information regarding a search query to determine one or more remote computers to which the search queries should be sent; c) reading by the control computer at least one configuration file containing meta-language information applicable to each of the one or more remote computers for parsing information obtained from each of the one or more remote computers; d) polling the one or more remote computers by the control computer to fulfill the search query; e) receiving information in the control computer regarding the search query from the one or more remote computers; f) parsing the information received from the one or more remote computers using the meta-language instructions to form parsed information; g) grouping the parsed information into at least one set of aggregated information; and h) delivering the aggregated information to the requesting computer.

It is preferred that the computer implemented method include the step of filtering information using filter commands regarding the search query from the one or more remote computers using the control computer to more precisely match the search query.

Preferably, the step of creating the configuration file by entering meta-language instructions applicable to programs on the one or more remote computers onto computer-readable media for access by the control computer. It is further preferred that the step of creating the configuration files includes entering meta-language instructions that are based on text commands that instruct the control computer to perform string and numerical search and extraction operations. Preferably the step of creating the configuration file includes entering search command meta-language instructions that instruct the control computer to search for a particular string of characters. Preferably, the step of creating the configuration file also includes entering search command meta-language instructions that instruct the control computer to extract a string of characters and store the string of characters as an item field. The step of creating configuration files further preferably includes entering search command meta-language instructions that instruct the control computer to discard items that do not meet predetermined criteria defined in the filter commands. It is further preferred that the step of creating the configuration file includes entering search command meta-language instructions that instruct the control computer to control the execution of the control computer instructions in implementing the method.

It is preferred that the step of entering meta-language instructions that are based on text commands includes entered meta-language commands as a block of commands, with each block of commands being defined for a particular program resident on the one or more remote computers.

The method further preferably includes the step of detecting using the control computer, the format of the information regarding the search query from the one or more remote computers and choosing an appropriate sequence of meta-language to parse that information.

The computer implemented method of the present invention is effective for internet use. Accordingly, the computer implemented method for retrieving by a control computer select information from one or more remote computers uses the internet, and each of the one or more remote computers has resident one or more web sites. The method therefore include the steps of: a) receiving by the control computer information regarding a search query from an internet user's computer; b) generating a search query using the internet user's browser software; c) analyzing using the control computer, the information regarding the search query to determine which of the one or more web sites to which the search query should be directed; d) reading by the control computer, at least one configuration file containing meta-language information applicable to each of the one or more web sites for parsing information obtained from each of the one or more web sites; e) polling the one or more web sites by the control computer to fill the search query; f) receiving information in the control computer regarding the search query from the one or more web sites; g) parsing the information received from the one or more web sites using the meta-language instructions to form parsed information; h) grouping the parsed information into at least one set of aggregated information; and i) delivering the aggregated information to the internet user's browser resident on the requesting computer to fulfill the search query.

Preferably, the method further includes the step of filtering information using filter commands regarding the search query received from the one or more web sites using the control computer to more precisely match the search query.

It is preferred that the method further include the step of creating the computer configuration file by entering meta-language instructions applicable to each web site to be polled onto computer-readable media for access by the control computer. It is preferred that the step of creating the configuration file by entering meta-language instructions applicable to each of the one or more web sites on a computer readable media for access by the control computer includes entering search command meta-language instructions that instruct the control computer to discard items that do not meet predetermined criteria defined in the filter commands.

It is further preferred that the step of creating the configuration file includes entering search command meta-language instructions that instruct the control computer to control the execution of the control computer instructions and implementing the method. Preferably the step of entering meta-language instructions that are based on text commands includes entering meta-language commands as a block of commands with each block of commands being defined for a particular web site. It is further preferred that the method include the step of detecting using the control computer the format of the information regarding the search query from the one or more web sites and choosing an appropriate sequence of meta-language instructions to parse the information.

According to another preferred embodiment of the present invention, a computer program product is provided. The computer program product includes a computer useable medium having a computer readable code embodied thereon for retrieving by a control computer select information from one or more remote computers. The computer program product includes: a) computer readable program code devices configured to cause a computer to receive information regarding a search query from a requesting computer; b) computer readable program code devices configured to cause a computer to analyze the information regarding a search query to determine which of the one or more remote computers to which the search query should be sent; c) computer readable program code devices configured to cause a computer to read at least one configuration file containing meta-language information applicable to each of the one or more computers for parsing information obtained from the one or more remote computers; d) computer readable program code devices configured to cause a computer to poll the one or more computers to fulfill the search query; e) computer readable program code devices configured to cause a computer to receive information regarding the search query from the one or more remote computers; f) computer readable program code devices configured to cause a computer to receive information regarding the search query from the one or more remote computers; g) computer readable program code devices configured to cause a computer to parse the information received from the one or more remote computers using meta-language instructions to form parsed information; h.) computer readable program code devices configured to cause a computer to group said parsed information into at least one set of aggregated information and i) computer readable program code devices configured to cause a computer to deliver the aggregated information to the requesting computer.

Preferably, the computer program products further includes computer readable program code devices configured to cause a computer to filter information using a search query received from the one or more remote computers using the control computer to more precisely match the search query.

The computer program product further preferably includes computer readable program code devices configured to define the configuration file as meta-language instructions applicable to each of the one or more remote computers to be polled for access by the control computer.

As with the computer implemented method of the present invention, another embodiment of the computer program product is particularly suited for internet use. To that end, a computer program product includes a computer useable medium having computer readable program code embodied thereon for retrieving by a control computer select information from internet web sites. The computer program product includes: a) computer readable program code devices configured to cause a computer to receive information regarding a search query form an internet user's computer, the search query being generated using internet user's internet browser software; b) computer readable program code devices configured to cause the computer to analyze the information regarding the search query to determine which of the one or more web sites to which the search query should be delivered; c) computer readable program code devices configured to cause a computer to read at least one configuration file containing meta-language information applicable to each of the one or more web sites for parsing information obtained from each of the one or more web sites; d) computer readable program code devices configured to cause a computer to poll the one or more web sites to fulfill a search query; e) computer readable program code devices configured to cause a computer to receive information regarding the search query from the one or more web sites; f) computer readable program code devices configured to cause a computer to parse the information received from the one or more web sites using the meta-language instructions to form parsed information; g) computer readable program code devices configured to cause a computer to group the parsed information into at least one set of aggregated information and h) computer readable program code devices configured to cause a computer to deliver the aggregated information to the internet user's web browser resident on the requesting computer.

The present invention further preferably includes computer readable program code devices configured to cause a computer to filter information using filter commands regarding the search query received from the one or web sites using the control computer to more accurately fulfill the search query.

The present invention further preferably includes computer readable program code devices configured to define the configuration file as meta-language instructions application to each of the one or more web sites to be polled for access by the control computer. By the above, the present invention provides a computer implemented method and a computer program product that will perform efficient and accurate searches on computers, preferably a search conducted on the internet responsive to an internet user's search request.

BRIEF DESCRIPTION OF THE DRAWINGS

FIGS. 2(a)–2(i) are interrelated and disclose the general algorithm of the method and computer program product illustrated in FIG. 1;

DESCRIPTION OF THE PREFERRED EMBODIMENTS

Figure 1:
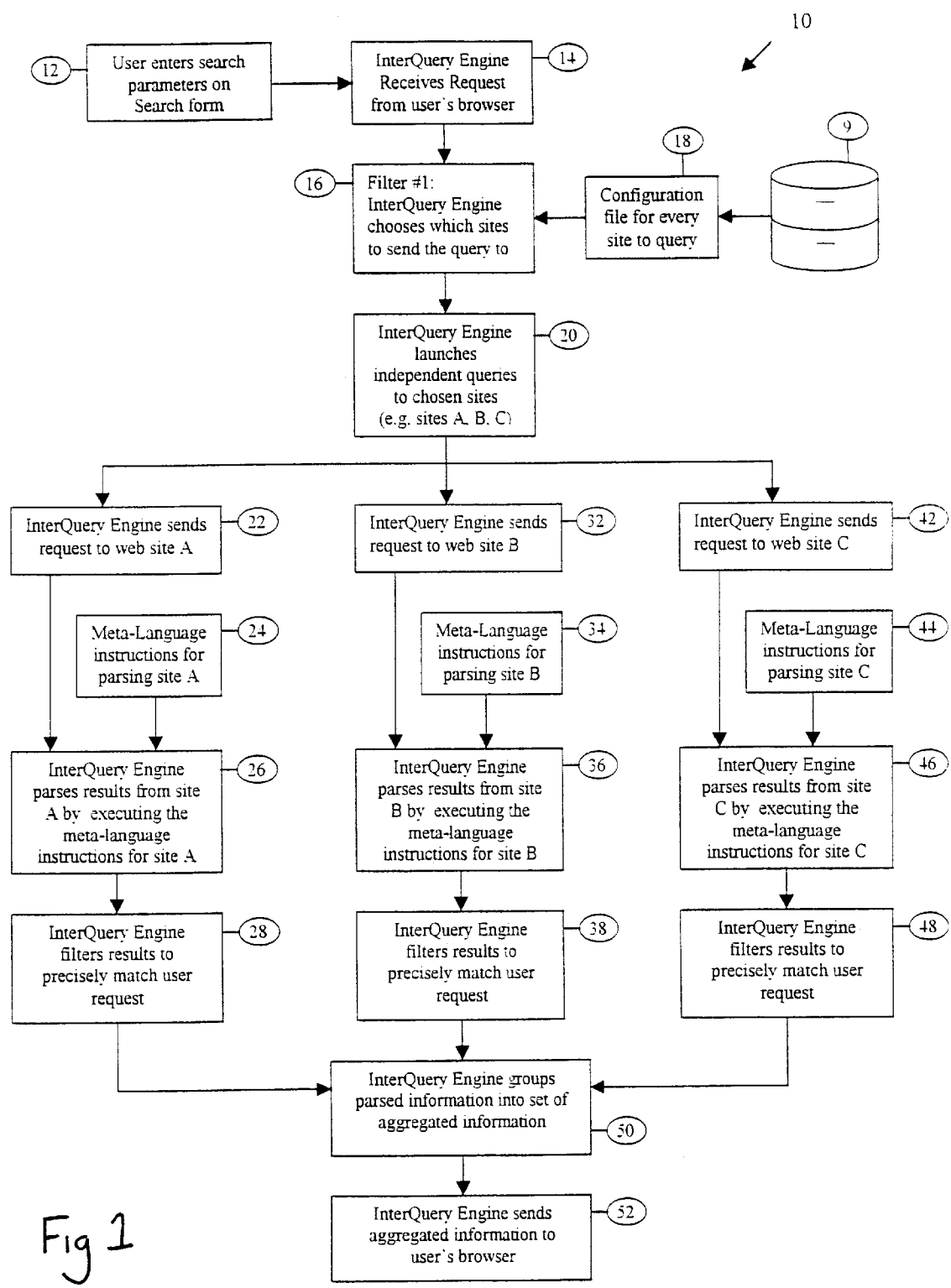
FIG. 1 is a flowchart depicting the preferred embodiment of the present invention according to one preferred embodiment of the present invention.

According to the preferred embodiments of the present invention, a computer implemented method and a computer program product are providing for parsing information obtained during a computerized search. The computer implemented method and computer program product (collectively "the parsing engine") is one of two modules of a specialized search engine. The search engine includes a query engine and the parsing engine. The query engine seeks out and queries web sites for specific information and the parsing engine parses structured text received as a result of the queries to extract the requested information. The text obtained from the web sites may or not be the result of a query from the query engine, therefore, the parsing engine is operable separately from the query engine and stands as an independent computer implemented method. The present invention may be used for various computer searching tasks, particularly on the internet. An example of such use would be a "virtual" shopping trip where a consumer will seek out a particular item for purchase, such as a book, clothing or a compact disc. Each item for purchase will have several characteristics in common with other like items. For example, a book will have an author, and ISBN number, and usually a stock number, a retail price and a selling price. Similarly, compact discs may have an artist, manufacturers number, genre information and pricing information. Each of these items that are common to a particular type of goods may be referred to as an item of information which is made up of a fixed number of fields. Each of the aforesaid common types of information can constitute a field. Therefore, a search engine will find the proper web sites to query and a parsing engine will seek out the fields in the query results that best match the search query.

The format of the text received by the parsing engine may be based on standard encoding techniques such as hypertext mark up language (HTML) or extended mark up language (XML). Alternately, it may be simple text in any language. The items of information in the received text must all be represented in the same format and the fields of an item may be of fixed width or variable lengths separated by delimiters. Fields may be mandatory or optional in which case their value may be omitted.

Every site queried by the query engine usually has a different way of organizing the pages returned as a result of the query. It is therefore important for the parsing engine to be able to adapt to any kind of result format. The parsing engine uses meta-language instructions that make it completely independent of any particular format. As will be seen, the web sites that are searched are known in advance and a configuration file is created having meta-language instructions for parsing the pages returned by each web site. The meta-language is based on text commands that instruct the engine to perform string and numerical search and extraction operations. As will be seen in greater detail hereinafter, the parsing engine is able to dynamically detect which format the resulting text is in and it chooses the appropriate sequence of meta-language instructions to parse the resulting text.

The parsing engine is able to parse items that are organized in horizontal table rows or vertical table columns. This means that the item being search is fully described in one row of the table or one column of the table and the row or column contains all the fields describing that item.

For example, a book may be represented as follows:

| Author | Title | Year Published | Price |
|---|---|---|---|
| Jane P. Doe | Earth Now | 1999 | $29.99 |
| Jane Dough | Earth & Sky | 1998 | $24.95 |

Vertical columns, representing the same information for parsing is presented below:

| Author | Jane P. Doe | Jane Dough |
|---|---|---|
| Title | Earth Now | Earth & Sky |
| Year Published | 1999 | 1998 |
| Price | $29.99 | $24.95 |

The parsing engine is able to handle items that are grouped together or there may be a group header that contains the value of one of the fields for all items in the group. For example, a search for computers may return a results page where computers are grouped by brand, and the brand is in the group header. The parsing engine is able to extract several fields for each item. These fields may be character strings, such as a book or CD title, numerical, such as the price of a book, images or URL's. For example, the parsing engine is able to extract a URL pointing to the details of the item or to an image file representing the item. The parsing engine may also assign a default value to a field that is not present or to assign a fixed value to a field. For efficiency and performance reasons, the parsing engine may also skip a number of characters from the beginning of the page before it starts parsing the page.

Turning now to FIG. 1, a flow chart represents the general operation of the computer implemented method of the present invention. Computer readable media is diagrammatically represented at 9 as a magnetic readable disc, but it will be understood by those skilled in the art that the computer readable media on which the computer product resides may be any form of media, internal or external to a computer. Further, it will be apparent to those skilled in the art that any applicable and functional code can be used to carry out the method or to form the product of the present invention and it should be understood that the present invention will not be limited to any particular computer code. The principles of the present invention are equally applicable regardless of the medium in which the code resides.

With continued reference to FIG. 1, a computer implemented method for parsing search results received from a web site query is illustrated generally at 10 and begins when the user enters search parameters on a browser search form as illustrated at 12. The search engine receives the request from the user's browser as illustrated at 14, then, the search engine employs a filter to choose a web sites or sites to which the query should be sent, as illustrated at 16. Based on the web sites chosen, a configuration file is accessed, as illustrated at 18. The configuration file is constructed in advance and includes the meta-language instructions for each web site from which results will be parsed.

The search engine then launches independent inquiries at the chosen sites, for example, site A, site B and site C, illustrated at 20. As illustrated at 22, the search engine sends a request to web site A. The web site responds with query results, and, as illustrated at 24, meta-language instructions are applied to parse the information from site A. As illustrated at 26, the query engine parses the results from web site A by executing the meta-language instructions for web site A. Next, as illustrated at 28, the parsing engine filters the results to more accurately match the user's search request.

The process is repeated for web site B beginning at 32. As illustrated at 32, the search request is sent to web site B. Results are returned and meta-language instructions for parsing site B are applied as illustrated at 34. The parsing engine parses the results from the site by executing the meta-language instructions for web site B as illustrated at 36. As illustrated at 38, the search engine filters a result to more accurately match the user's search request.

The process is once again repeated for web site C. It will be understood by those skilled in the art that the process is typically applied simultaneously to many web sites, although it may be applied serially to each web site. In any event, the search engine receives results from web site C and meta-language instructions are applied for parsing web site C as illustrated at 44. As illustrated at 46, the parsing engine parses results from web site C by executing the meta-language for web site C. The search engine then filters the results to more accurately match the user's search request as illustrated at 48. Finally, as illustrated at 50, the search engine groups the parsed information into a set of aggregated information, and, as illustrated at 52, sends the aggregated information to the user's browser.

A key component of the present invention is the application of meta-language instructions to parse information received from the web site. The meta-language instructions are a set of commands that instruct the parsing engine to perform a variety of search and extraction operations. The basic principle is that of a sequential search method wherein the search engine maintains a current position, and every parsing command instructs the engine to perform an operation from the current position. After each command is executed, the current position becomes the end of the string found.

There are four types of commands. First, search commands instruct the engine to search for a particular string of characters. Second, extraction commands instruct the engine to extract a string of characters and store the string as a field of an item. Third, filter commands are used to ask the engine to discard item that do not meet certain criteria defined in the filter commands. Finally, control commands control the execution of the engine.

The following describes meta-language commands.

Search Commands

Command: Begin Item. Argument: string to search for. The string passed as the argument is the beginning of a new item. The command searches for the string passed as argument. If the string is not found, the engine stops the parsing, and returns all previously parsed items. If the string is found, the engine sets the current position to the end of the string.

Command: Search for mandatory string. Argument: string to search for. If the string is not found, the engine stops the parsing, and returns all previously parsed items, If the string is found, the engine sets the current position to the end of the string.

Command: Search for optional string. Argument: string to search for. If the string is not found within the current line, skip the next command. If the string is found, set the current position to the end of the string.

Extraction Commands

Command: Extract field (variant 1). Arguments: string delimiter and field number. The engine extracts the string that starts at the current position and ends at the beginning of the delimiter; the delimiter can be a single character, or a character string. The extracted string is stored in the item's field identified by the field number argument; if the field already contains a value, the extracted string either replaces it or extends it. After completion of the extraction operation, the current position becomes the end of the delimiter string.

Command: Extract field (variant 2). Arguments: field length and field number. The engine extracts the string that starts at the current position and has the length passed as argument; the length can be positive (forward extraction) or negative (backward extraction). The extracted string is stored in the item's field identified by the field number argument; if the field already contains a value, the extracted string either replaces it or extends it. After completion of the extraction operation, the current position is incremented by the length.

Command: Assign fixed value to field. Arguments: field number, and string value. The engine assigns the value passed as argument to the item's field identified by the field number argument. The value can be of any length.

Command: Extract item details URL. Argument: string. The engine extracts a URL that represent a WWW address of the item's detailed listing. The beginning of the URL is identified by the string passed argument.

Command: Extract item image URL. Argument: String. The engine extracts a URL that represent the WWW address of the item's image file. The beginning of the URL is identified by the string passed as argument.

Filter Commands

Command: Text filter. Arguments: value and field number. This filter tells the engine to discard an item if the text string given in the filter command is not present in one of the item's fields.

Command: Numerical filter. Arguments: value and field number. This filter tells the engine to discard an item if the numerical value given in the filter command is greater than, or less than or equal to the value of one of the item's fields.

Control Commands

Command: Set end-of-line character. Argument: end-of-line character or string. The engine treats the given character or string as the end-of-line mark. All optional search commands operate until the end of the current line.

Command: Skip beginning. Argument: number. The engine skips the specified number of characters before starting parsing the input text.

Command: End-of-item. The engine closes the current item, and starts parsing the next item. Some post-parsing operations can be performed on the item at this point, such as applying the filters defined with the commands described above in Filter Commands.

Command: Define URL format. Argument: number. This command defines what the URL format is used by commands in "extract item details URL" and "Extract item image URL" above.

As explained above, the parsing engine is capable of parsing input text from many different sources. For each source of input, a block of commands needs to be created to parse the input from that particular source. A block of meta-language commands is typically made of three or more sections that are in a particular order as follows.

Command Block

Header Section. Contains one of each of the following commands, in the order;

A. Skip beginning command

B. End-of-line character command.

Filter Section. Contains any number of the following commands, in any order:
  A. Text Filter commands
  B. Numeric Filter commands.
Item Parsing Section. Contains the following commands:
  A. One Begin Item command, that must be the first command of the section;
  B. A Sub-section containing any number of the following commands, in any order:
    1. Search for mandatory string
    2. Search for optional string
    3. Extract Field, variants 1 and 2
    4. Assign fixed value to field
    5. Extract details URL
    6. Extract image URL
  C. One End-of-Item command that must be the last before one command of the section
  D. One Define URL Format command that must be the last command of the section There may be any number of item parsing sections in a block. Each item parsing section represents a different possible encoding of input from that source. To determine which section to use for particular input from that source, the engine will successively try to execute the Begin Item command of each section until the string passed as argument of one of the Begin Items is found. It will then proceed to parse the input with the commands in that section.

In order for the engine to extract multiple items from an input text, the commands of the item parsing section contained in the subsection between the begin item and end of item commands are executed repeatedly. After the engine executes the end of item command, it loops back to the first command of the subsection as will be explained in further detail, presently. The engine exits the loop whenever a search for mandatory string commands fail. Each loop iteration extracts one item from the input text.

Figure 2A:
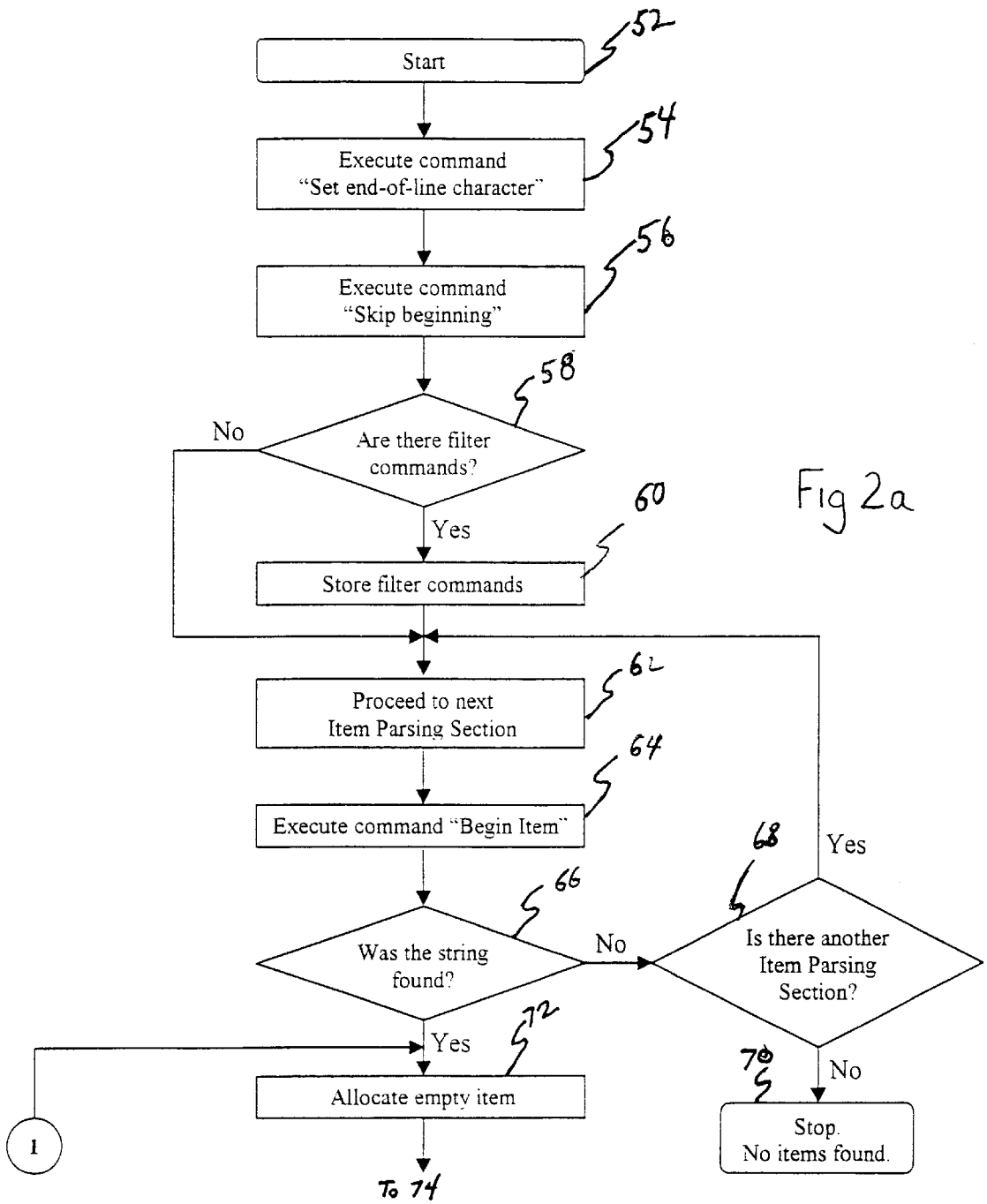

FIGS. 2(a)–2(i) describe the general algorithm of the parsing engine. With reference to FIG. 2(a) the process starts as illustrated at 52, and as illustrated at 54, the command set end of line character is executed. As illustrated at 56, the Skip Beginning command is executed. As illustrated at 58, a question is asked whether there are any filter commands. If the answer is yes, the filter commands will be stored as illustrated at 50. If the answer is no, this command is skipped. As illustrated at 62, advances are made to the next item parsing section. As illustrated at 64, the command Begin Item is then executed. Next, as illustrated at 66, a question is asked whether the string was found. If the string was not found, another question is asked whether there is another item parsing section as illustrated at 68. If the answer is yes, the process begins again at Item 62 and proceeds to the next item parsing section. If the answer is no, the process is halted as illustrated at 70 where no items are found.

Returning to the question of whether the string was found as illustrated at 66, if the string was found, the process proceeds to allocate an empty item as illustrated at 72.

Figure 2B:
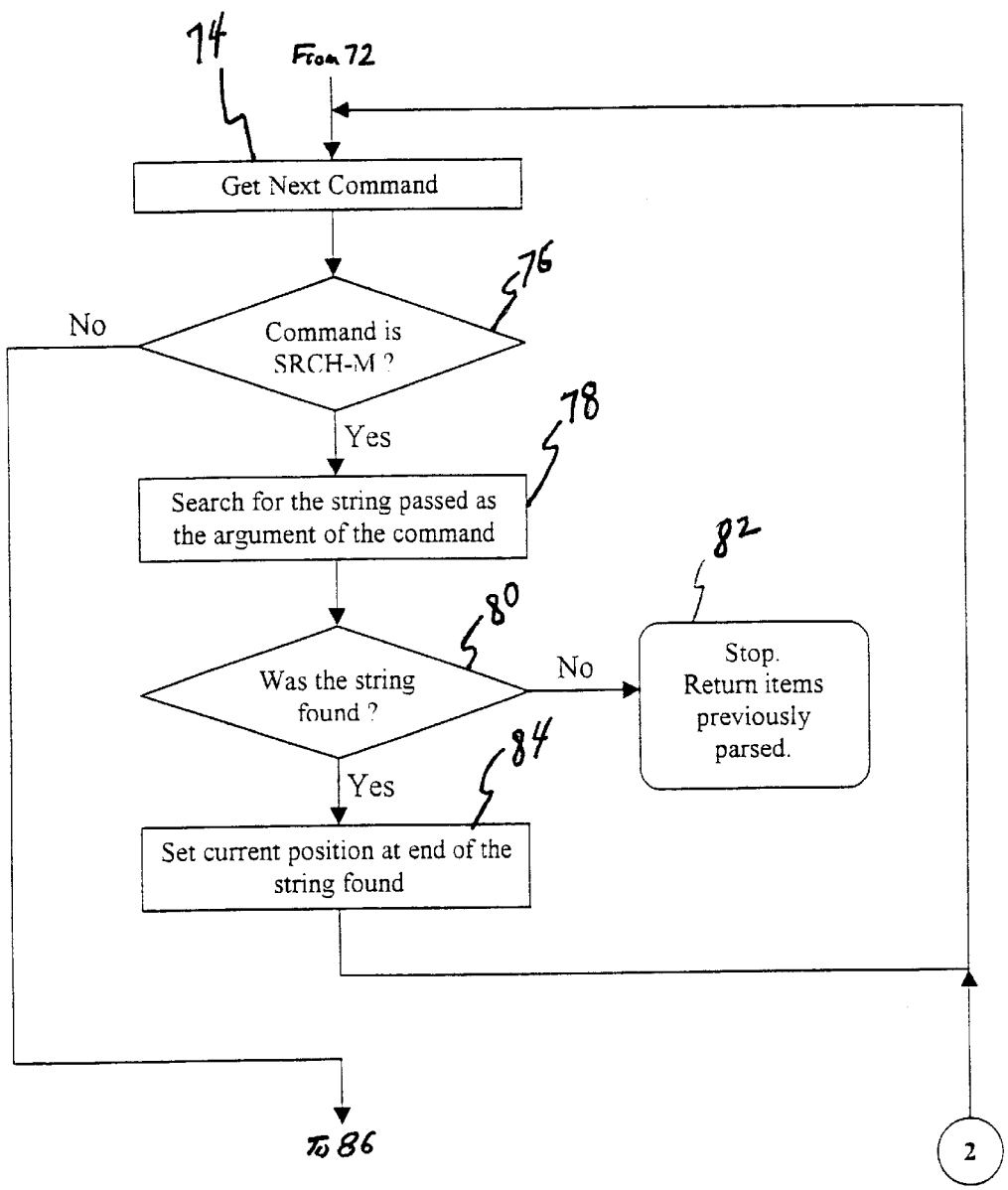
Figure 2C:
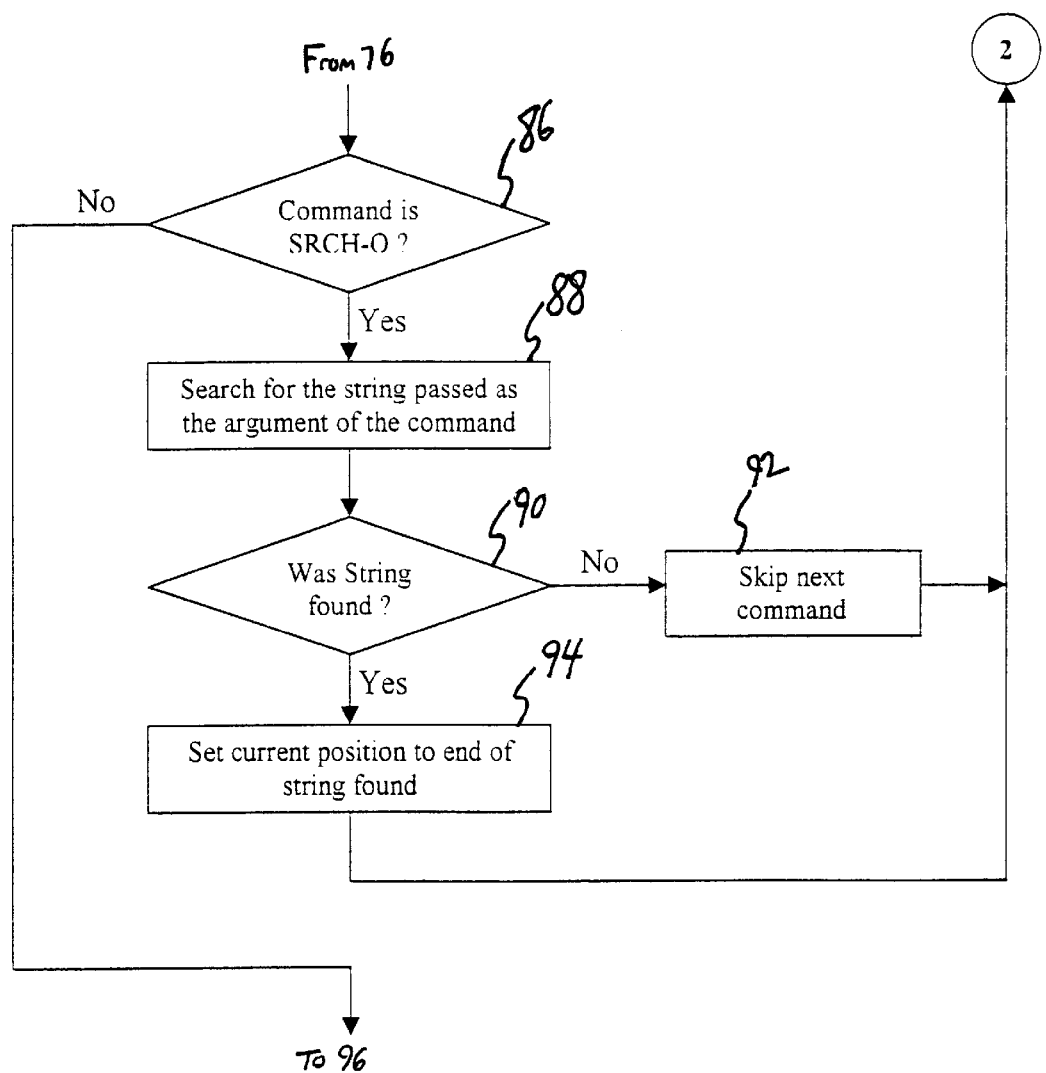

Turning now to FIG. 2(b) the process proceeds to get the next command as illustrated at 74. Next, as illustrated at 76, a question arises as to whether the command is SEARCH FOR MANDATORY STRING, if the answer is yes, the process proceeds to block 78 where the search for the string is passed an argument of the command. Then, a next question arises as to whether the string was found as illustrated at 80. If the string was not found, as illustrated at 82, previously parsed items are returned and the process is stopped. If the answer is yes, as illustrated at 84, the current position is set at the end of the string that was found. Then, the process enters a loop back to position 74 until the search command is found to not be SEARCH FOR MANDATORY STRING. Once that is the case, and as illustrated at FIG. 2(c), the question is asked whether the command is SEARCH FOR OPTIONAL STRING. If so, the search proceeds for the string passed as the argument of the command as illustrated at 88. As illustrated 90, the question arises whether the string was found. If not, as illustrated at 92, the next command is skipped and the process returns to the get next command block at 74 and recommences there. If the string was found, the process sets the current position to the end of the string found as illustrated at 94, and then returns to the get next command block at 74.

Figure 2D:
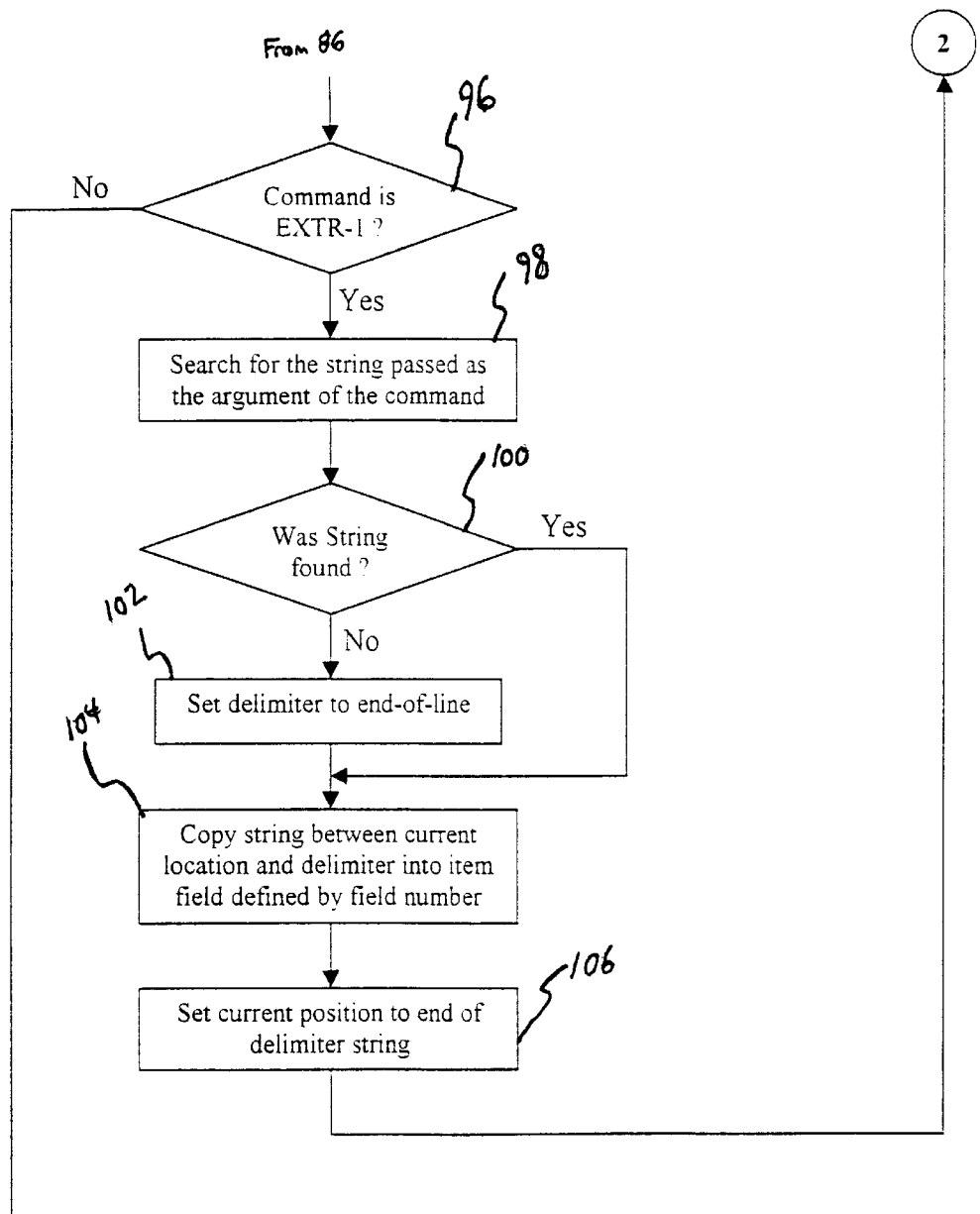

If the command found was not SEARCH FOR OPTIONAL STRING when queried at 86, and with reference to FIG. 2(d), the question is asked whether the command is EXTRACT FIELD (VARIANT 1) as illustrated at 96. EXTRACT FIELD (VARIANT 1) is the first extraction command. If so, the search for the string is passed as the argument of the command as illustrated at 98. The question then arises as to whether the string was found as illustrated at 100. If not, the delimiter is set to end of line as illustrated at 102. If the string was found, that step is skipped and the process proceeds to block 104, where the copy string between the current location and delimiter is placed into the item field defined by the field number. This occurs after block 102 as well. Then as illustrated at block 106, the current position is set at the end of delimiter string and the process returns to block 74 which is get next command.

Figure 2E:
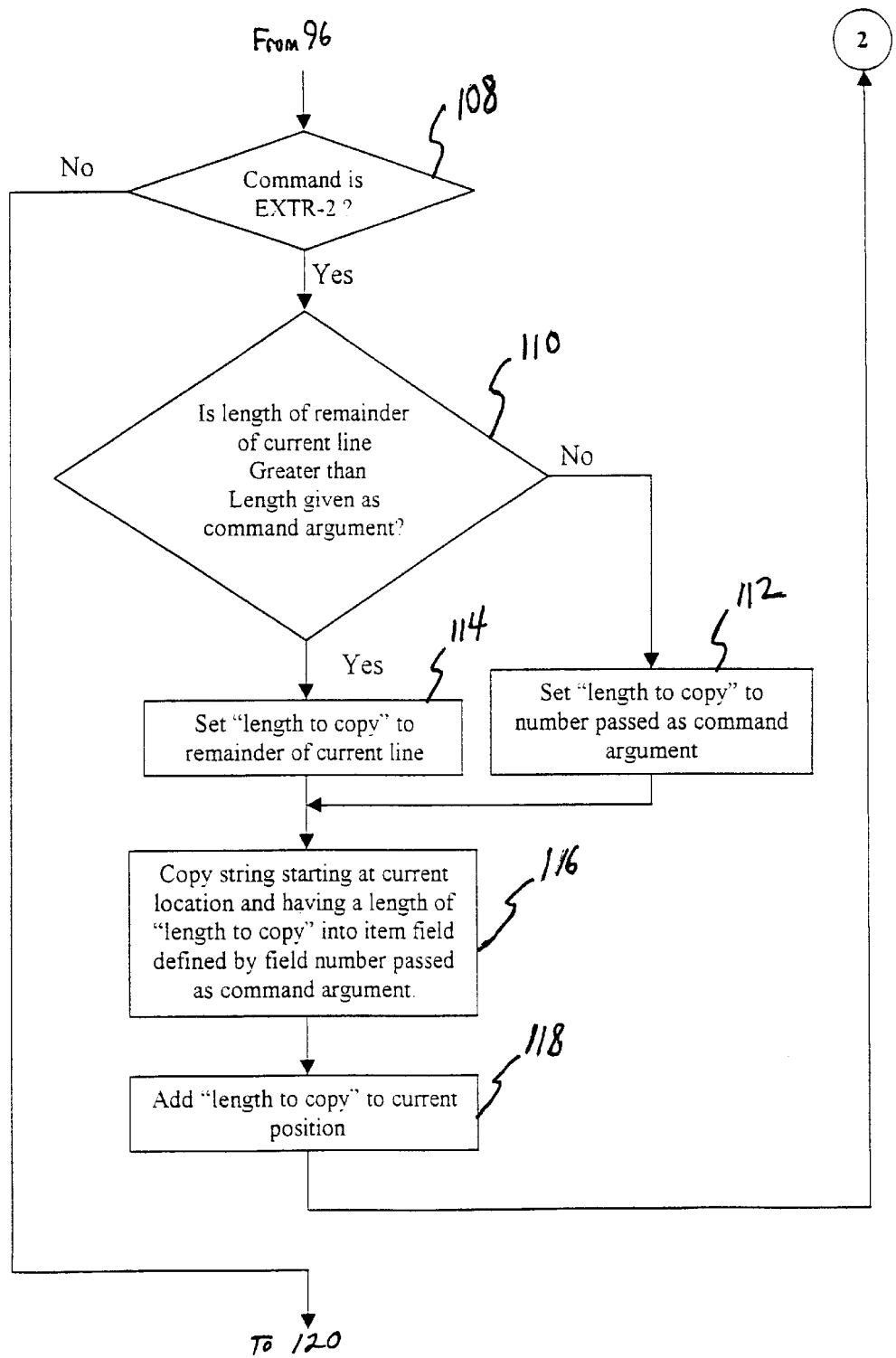
Figure 2F:
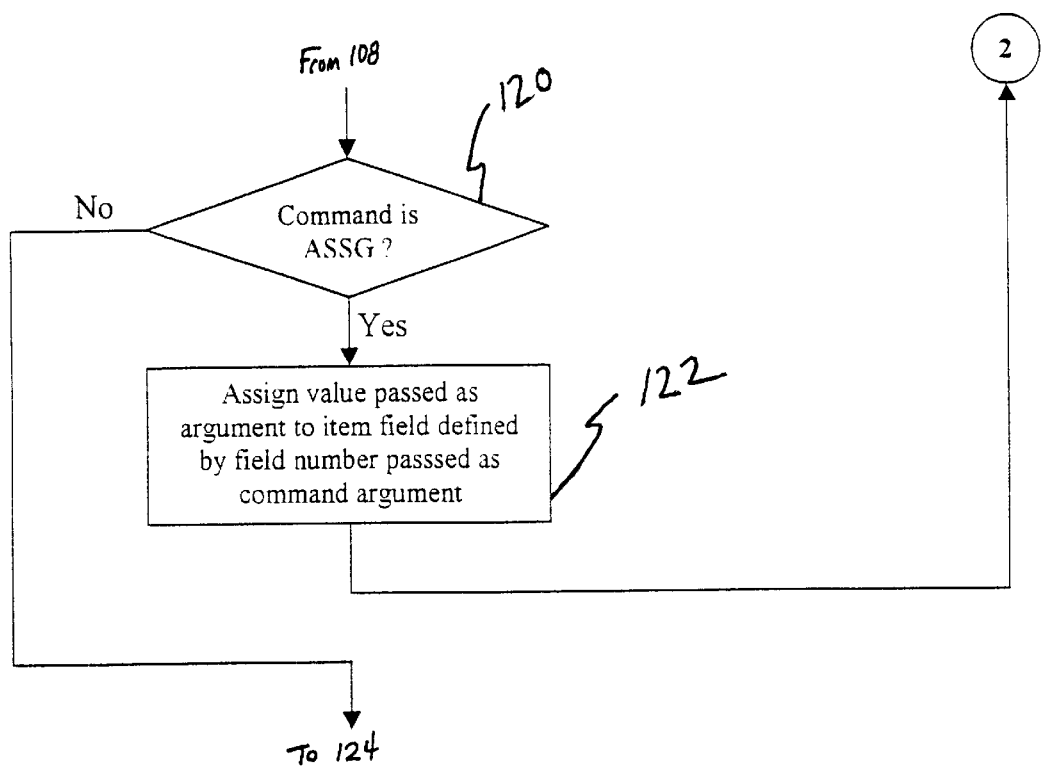
Figure 2G:
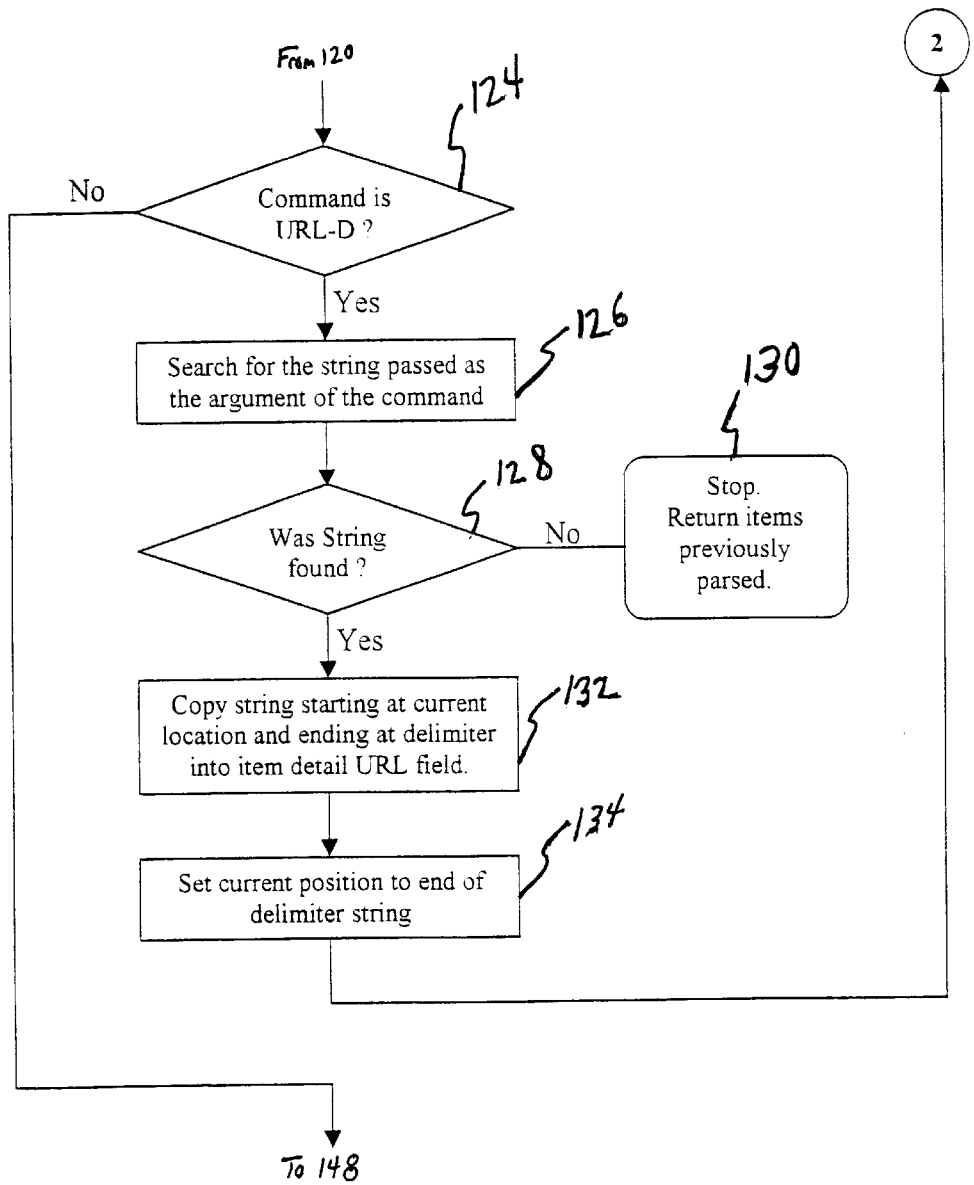
Figure 2I:
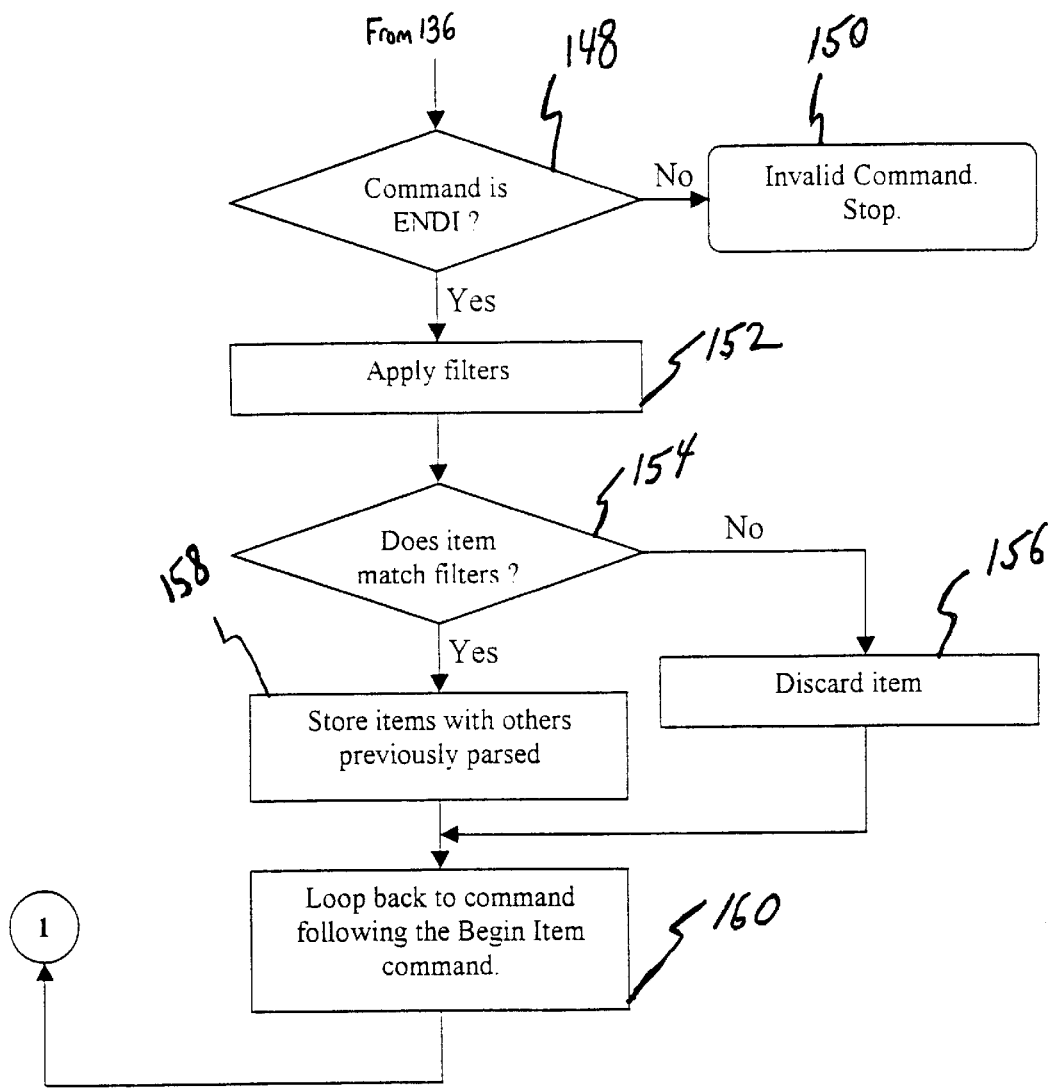

If the command was not EXTRACT FIELD (VARIANT 1), the question arises, as illustrated in FIG. 2(e) if the command was EXTRACT FIELD (VARIANT 2), as illustrated at 108. If so, as illustrated at 110, a question arises as to where the length of the remainder of the current line is greater than the length given as the command argument. If not, as illustrated at 112, the "length to copy" to number is passed as the command argument. If so, length to copy is set to the remainder of the current line as illustrated at 114. In either case, the next command is illustrated at 116 where the copy string starting at the current location and having a length of "length to copy" is inserted into an item field defined by the field number passed as a command argument. As illustrated at 118, "length to copy" is added to the current position. The process then returns to block 74 which is get next command. If the command was not EXTRACT FIELD (VARIANT 2) as queried at block 108 and with reference to FIG. 2(f), a query is made whether the command is ASSIGN VALUE TO FIELD as illustrated at 120. If so, the process assigns a value passed as the argument to the item field defined by the field number passed as the command argument, as illustrated at 122. If the command is not ASSIGN VALUE TO FIELD as queried at block 120, and with reference to FIG. 2(g), the question is raised whether the command is EXTRACT ITEM DETAILS URL as illustrated at 124. If so, search for the string is passed as the argument of the command as illustrated at 126. The question is then asked whether a string was found as illustrated at 128. If not, the new process stops and items previously parsed are returned as illustrated at 130. If the string was found, the string is copied, starting at the current location and ending at the delimiter into the item detail URL field, as illustrated at 132. Next as illustrated at 134, the current position is set to the end of the delimiter string. The process then returns to the get next command bock, illustrated at 74. If, as illustrated at 124, the command is not EXTRACT ITEM DETAILS URL, then, with reference to FIG. 2(h) the question is asked whether the command is EXTRACT ITEM IMAGE URL, as illustrated at 136. If so, the search for the string is passed as the argument of the command as illustrated at 138. The question is again asked whether the string was found as illustrated at 140. If not, as illustrated at 142, the process stops and previous parsed items are returned.

If the string was found, the string starting at the current location and ending at the delimiter is copied into the item image URL field as illustrated at 144. Next, as illustrated at 146, the current position is set to the end of the delimiter string. The process then returns to the get next command block as 74. If, as illustrated at 136, the command is not EXTRACT ITEM IMAGE URL, then, turning to figure two, the question is asked as to whether the command is END-OF-ITEM as illustrated at 148. If not, this is determined to be an invalid command and the process is stopped as illustrated at 150. If the command is END-OF-ITEM filters are applied as illustrated at 152. Next as illustrated at 154, a question arises as to whether the item matches the filters. If not, the item is discarded at 156. If so, as illustrated at 158, the item is stored with others previously parsed. Whether the item is discarded or stored, the process continues to bock 160 which illustrates a loop back to the command following the begin item command. The process then returns to the allocate empty bottom block illustrated at 72 in FIG. 2(a).

By the above, the present invention provides a parsing engine which will efficiently and effectively parse items discovered in an internet search for particular items directed to particular web sites. The process is particularly useful for shopping and for other searches where different items will have common descriptive fields.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A computer implemented method for retrieving by a control computer select information from one or more remote computers, said method comprising the steps of:
   receiving by the control computer information regarding a search query from a requesting computer;
   analyzing using the control computer said information regarding a search query to determine which of the one or more remote computers to which search queries should be sent;
   reading by the control computer at least one configuration file containing meta-language information applicable to each of the one or more remote computers for parsing information obtained from each of the one or more remote computers;
   polling the one or more remote computers by the control computer to fulfill the search query;
   receiving information in the control computer regarding said search query from the one or more remote computers;
   parsing the information received from the one or more remote computers using said meta-language instructions to form parsed information;
   grouping said parsed information into at least one set of aggregated information; and
   delivering said aggregated information to the requesting computer.

2. A computer implemented method according to claim 1 and further comprising the step of filtering information using filter commands regarding said search query received from the one or more remote computers using the control computer to more precisely match the search query, thereby enhancing the accuracy of a search.

3. A computer implemented method according to claim 2 wherein said step of creating said configuration file includes entering search command meta-language instructions that instruct the control computer to search for a particular string of characters.

4. A computer implemented method according to claim 2 and further comprising the step of creating said configuration file by entering meta-language instructions applicable to programs on the one or more remote computers onto computer readable media for access by said control computer, and wherein said step of creating said configuration file includes entering search command meta-language instructions that instruct the control computer to discard items that do not meet predetermined criteria defined in said filter commands.

5. A computer implemented method according to claim 1 and further comprising the step of creating said configuration file by entering meta-language instructions applicable to programs on the one or more remote computers onto computer readable media for access by said control computer.

6. A computer implemented method according to claim 5 wherein step of creating said configuration file includes entering meta-language instructions that are based on text commands that instruct the control computer to perform string and numerical search and extraction operations.

7. A computer implemented method according to claim 6 wherein said step of creating said configuration file includes entering search command meta-language instructions that instruct the control computer to extract a string of characters and store said string of characters as an item field.

8. A computer implemented method according to claim 6 wherein said step of creating said configuration file includes entering search command meta-language instructions that instruct the control computer to control the execution of the control computer instructions in implementing said method.

9. A computer implemented method according to claim 6 wherein said step of entering meta-language instructions that are based on text commands includes entering meta-language commands as a block of commands, with each block of commands being defined for a particular program resident on one or more of the remote computers.

10. A computer implemented method according to claim 6 wherein said step of entering meta-language instructions that are based on text commands includes entering meta-language commands as a block of commands, with each block of commands being defined for a particular program resident on one or more of the web sites.

11. A computer implemented method according to claim 1 and further comprising the step of detecting using the control computer, the format of said information regarding said search query from the one or more remote computers, and choosing an appropriate sequence of meta-language instructions to parse said information.

12. A computer implemented method for retrieving by a control computer select information from one or more remote computers, using the internet, each of the one or more remote computers having resident one or more web sites, said method comprising the steps of:

receiving by the control computer information regarding a search query from an internet user's computer, said search query being generated using the internet user's internet browser software;

analyzing, using the control computer, said information regarding the search query to determine which of the one or more web sites to which search queries should be directed;

reading, by the control computer, at least one configuration file containing meta-language information applicable to each of the one or more web sites for parsing information obtained from each of the one or more web sites;

polling the one or more web sites by the control computer to fulfill the search query;

receiving information in the control computer regarding said search query from the one or more web sites;

parsing the information received from the one or more web sites using said meta-language instructions forming parsed information;

grouping said parsed information into at least one set of aggregated information; and delivering said aggregated information to the internet user's web browser resident on the requesting computer to fulfill the search query.

13. A computer implemented method according to claim 12 and further comprising the step of filtering information using filter commands regarding said search query received from the one or more web sites using the control computer to more precisely match the search query, thereby enhancing the accuracy of a search.

14. A computer implemented method according to claim 13 wherein said step of creating said configuration file includes entering search command meta-language instructions that instruct the control computer to search for a particular string of characters.

15. A computer implemented method according to claim 13 and further comprising the step of creating said configuration file by entering meta-language instructions applicable to each of the one or more web sites onto computer readable media for access by said control computer, and wherein said step of creating said configuration file includes entering search command meta-language instructions that instruct the control computer to discard items that do not meet predetermined criteria defined in said filter commands.

16. A computer implemented method according to claim 12 and further comprising the step of creating said configuration file by entering meta-language instructions applicable to each web site to be polled onto computer readable media for access by said control computer.

17. A computer implemented method according to claim 16 wherein step of creating said configuration file includes entering meta-language instructions that are based on text commands that instruct the control computer to perform string and numerical search and extraction operations.

18. A computer implemented method according to claim 17 wherein said step of creating said configuration file includes entering search command meta-language instructions that instruct the control computer to extract a string of characters and store said string of characters as an item field.

19. A computer implemented method according to claim 17 wherein said step of creating said configuration file includes entering search command meta-language instructions that instruct the control computer to control the execution of the control computer instructions in implementing said method.

20. A computer implemented method according to claim 12 and further comprising the step of detecting using the control computer, the format of said information regarding said search query from the one or more web sites, and choosing an appropriate sequence of meta-language instructions to parse said information.

21. A computer program product including a computer usable medium having computer readable program code embodied thereon for retrieving by a control computer select information from one or more remote computers, the computer program product comprising:

computer readable program code devices configured to cause a computer to receive information regarding a search query from a requesting computer;

computer readable program code devices configured to cause a computer to analyze said information regarding a search query to determine which of the one or more remote computers to which search queries should be sent;

computer readable program code devices configured to cause a computer to read at least one configuration file containing meta-language information applicable to each of the one or more remote computers for parsing information obtained from each of the one or more remote computers;

computer readable program code devices configured to cause a computer to poll the one or more remote computers to fulfill the search query;

computer readable program code devices configured to cause a computer to receive information regarding said search query from the one or more remote computers;

computer readable program code devices configured to cause a computer to parse the information received from the one or more remote computers using said meta-language instructions thereby forming parsed information;

computer readable program code devices configured to cause a computer to group said parsed information into at least one set of aggregated information; and computer readable program code devices configured to cause a computer to deliver said parsed information to the requesting computer.

22. A computer program product according to claim 21 and further comprising computer readable program code devices configured to cause a computer to filter information using filter commands regarding said search query received from the one or more remote computers using the control computer to more precisely match the search query, thereby enhancing the accuracy of a search.

23. A computer program product according to claim 21 and further comprising computer readable program code devices configured to define said configuration file as meta-language
instructions applicable to each of the one or more remote computers to be polled for access by said control computer.

24. A computer program product including a computer usable medium having computer readable program code embodied thereon for retrieving by a control computer select information from internet web sites, the computer program product comprising:

computer readable program code devices configured to cause a computer to receive information regarding a search query from an internet user's computer, said search query being generated using the internet user's internet browser software;

computer readable program code devices configured to cause a computer to analyze said information regarding a search query to determine which of the one or more web sites to which the search query should be delivered;

computer readable program code devices configured to cause a computer to read at least one configuration file containing meta-language information applicable to each of the one or more web sites for parsing information obtained from each of the one or more web sites;

computer readable program code devices configured to cause a computer to poll the one or more web sites to fulfill the search query;

computer readable program code devices configured to cause a computer to receive information regarding said search query from the one or more web sites;

computer readable program code devices configured to cause a computer to parse the information received from the one or more web sites using said meta-language instructions thereby forming parsed information;

computer readable program code devices configured to cause a computer to group said parsed information into at least one set of aggregated information; and computer readable program code devices configured to cause a computer to deliver said aggregated information to the internet user's web browser resident on the requesting computer.

25. A computer program product according to claim 24 and further comprising computer readable program code devices configured to cause a computer to filter information using filter commands regarding said search query received from the one or more web sites using the control computer to more accurately fulfill the search query.

26. A computer program product according to claim 24 and further comprising computer readable program code devices configured to define said configuration file as meta-language instructions applicable to each of the one or more web sites to be polled for access by said control computer.

\* \* \* \* \*